R. C. BROWNE.
TELEGRAPHONE.
APPLICATION FILED JUNE 23, 1908. RENEWED JUNE 19, 1909.
947,148.
Patented Jan. 18, 1910.
3 SHEETS—SHEET 1.
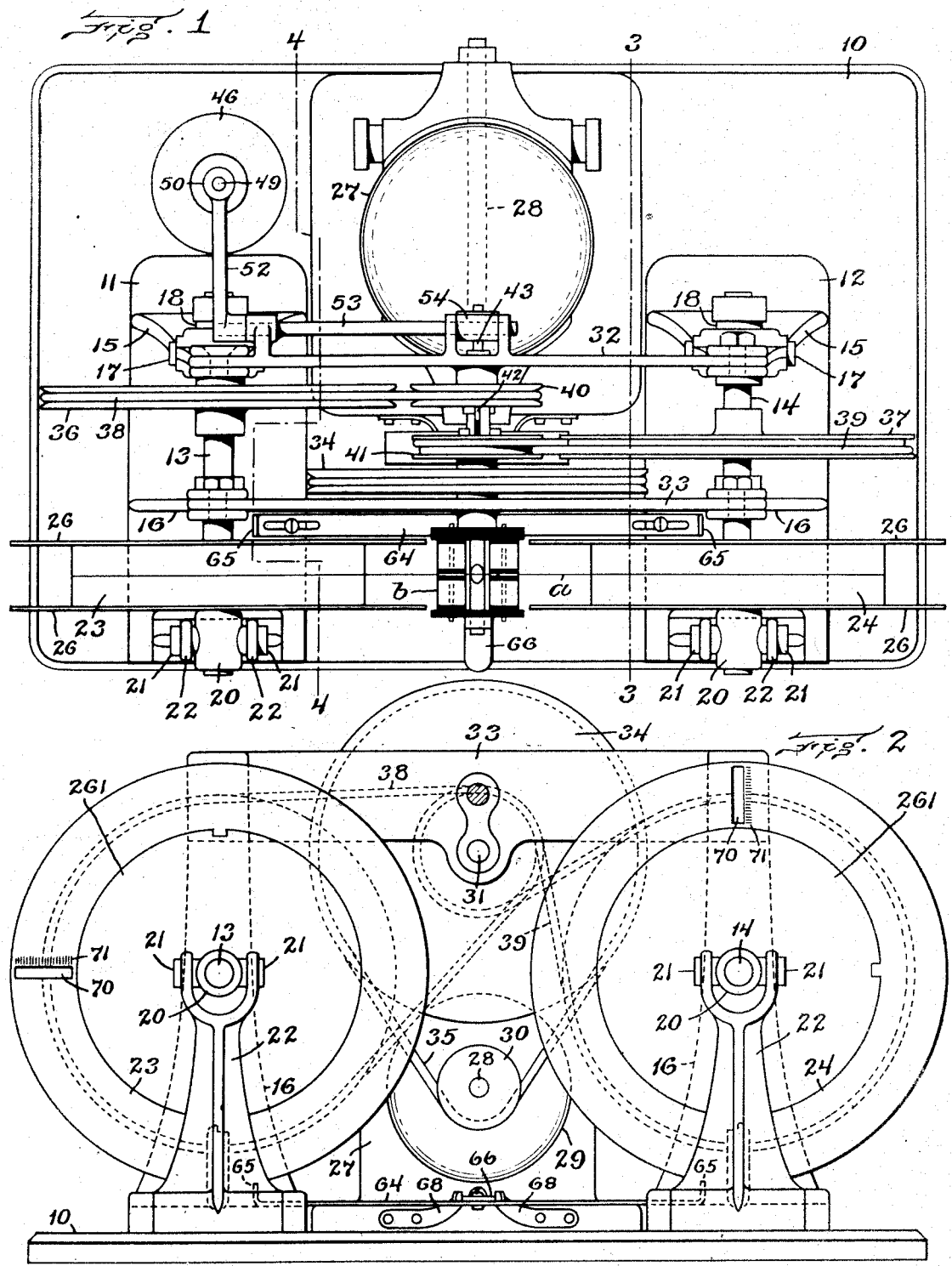

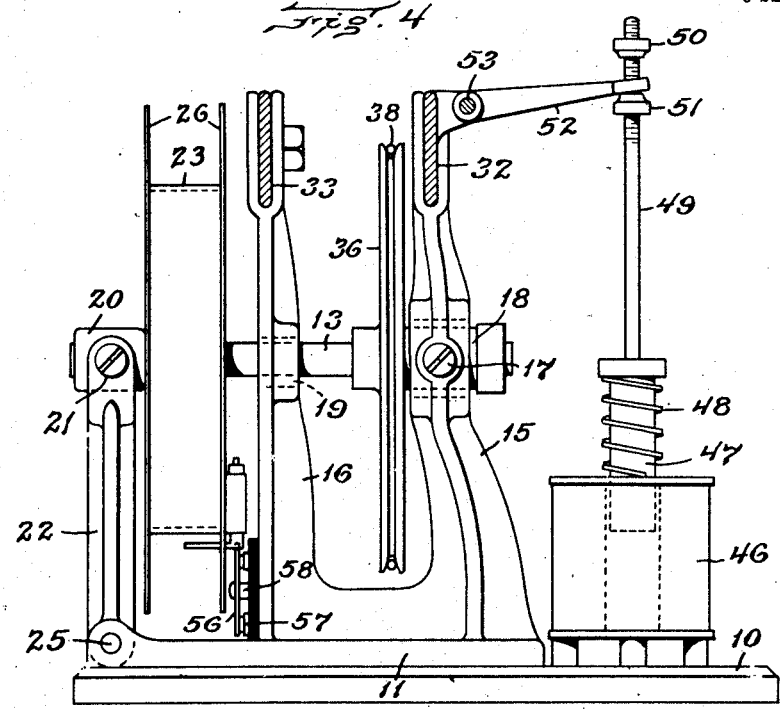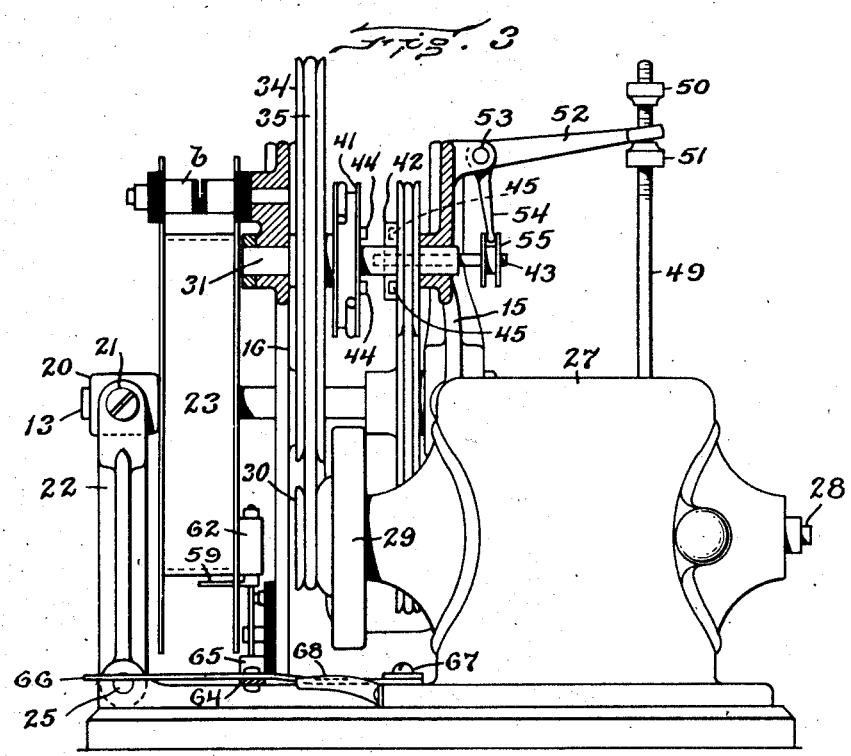

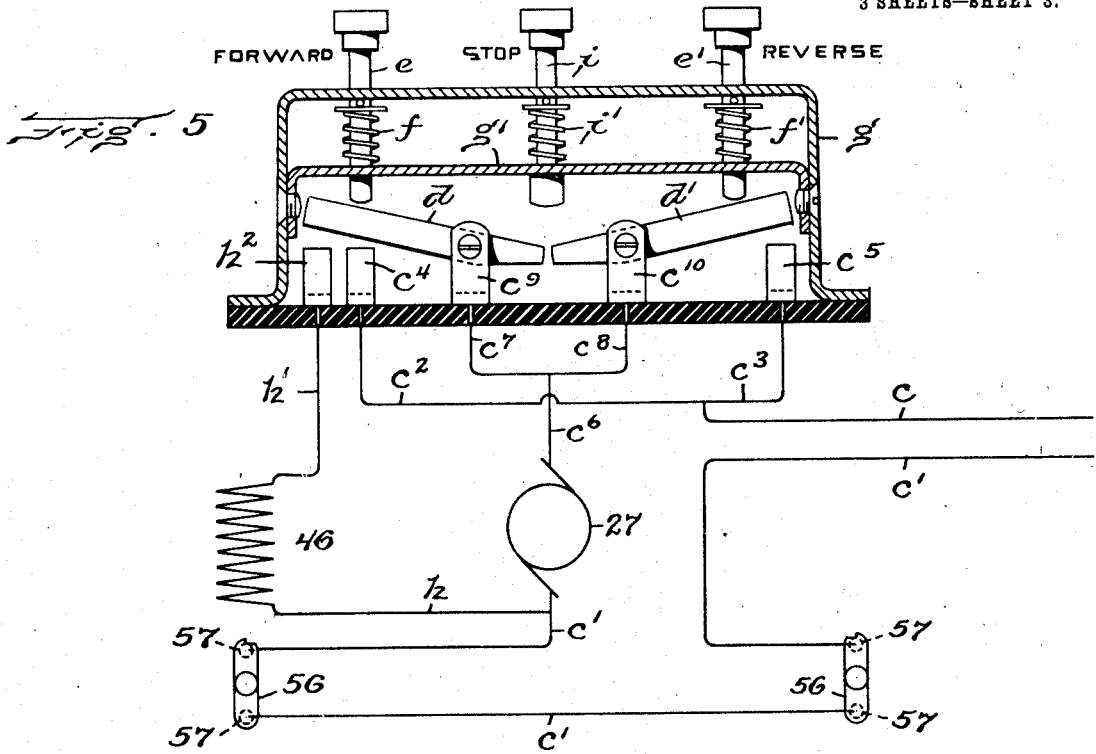
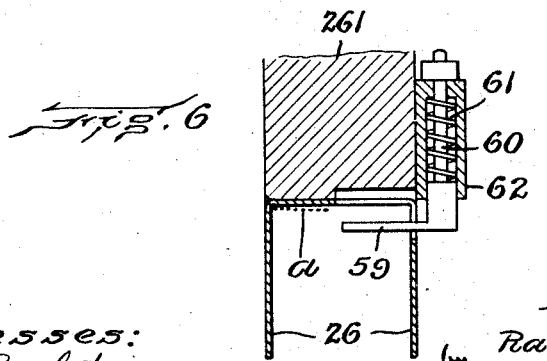

UNITED STATES PATENT OFFICE.

RALPH C. BROWNE, OF SALEM, MASSACHUSETTS, ASSIGNOR, BY MESNE ASSIGNMENTS, TO BROWNE APPARATUS COMPANY, OF SALEM, MASSACHUSETTS, A CORPORATION OF MASSACHUSETTS.

TELEGRAPHONE.

947,148.  Specification of Letters Patent.  Patented Jan. 18, 1910.

Application filed June 23, 1908, Serial No. 439,935. Renewed June 19, 1909. Serial No. 503,223.

*To all whom it may concern:*

Be it known that I, RALPH C. BROWNE, of Salem, in the county of Essex and State of Massachusetts, have invented certain new and useful Improvements in Telegraphones, of which the following is a specification.

This invention has relation to what I may term "telegraphones" in which sounds are recorded upon an elongated record wire. In such machines, the wire is wound from one reel upon another and is moved in proximity to the magnetic cores which are arranged in a telephone circuit. In the practical operation of such machines, it is necessary to stop and start the feeding of the record wire in one direction or the other, without permitting the wire to slacken and partially free itself from the reels in unrestrained loose coils, or else to break by reason of suddenly applied tension. A frequent stopping and starting of the wire is necessary, either in impressing thereon the magnetic record of sound or in listening to the audible duplication of the record as for transcription to paper, and in such cases it is highly desirable, if not imperative, that on each stoppage of the movement of the wire in one direction, its movement should be reversed so as to cause the partial rewinding or backward winding of the wire, in order that, in again resuming either dictation to the wire or auditory attention to its record, said wire shall be allowed a certain time interval to acquire its normal speed of movement before that portion of the record is reached at which the previous stoppage took place. If such time interval is not provided for, the necessary continuity of the record upon the wire may be, and usually is, broken or interrupted. This is obvious for the accuracy of the record is dependent upon a substantially constant or unvarying speed of movement, both in impressing the record on the wire and listening to the record, and an acceleration or retardation of the speed of the wire in either case renders it impossible for the operator to distinguish the sounds which the wire is intended to record.

The object of the present invention is to provide an improved machine, characterized by a simplicity in construction, in which it is possible to stop and start the machine in either direction without subjecting the record wire to sudden dangerous strains and without permitting the slackening or uncoiling of the wire from the reels.

Further objects of the invention are to effect the feeding of the wire at a substantially constant or unvarying speed, and to automatically effect a limited backward or reverse winding of the wire when its forward winding is stopped in order that the wire may be brought again to its normal speed before the operator commences to impress a record thereon or receive it therefrom.

I have accomplished these objects and avoided the objectionable features of previously suggested machines by a simple construction in which the forward rotation of the delivery reel is stopped by applying to it a rotary force in the direction opposite to the delivering rotation of said delivery reel. This force may be applied in various ways as by clutches, for instance, as a result of which, opposing forces act in opposite directions on the wire extending between the reels to keep it taut.

In order that the reels may be reversely wound, I employ in conjunction with the motor, which I prefer shall possess a unidirectionally rotatable driving shaft, clutching means by which the reels are rotated respectively in opposite directions by power transmitted from said shaft; and moreover I may likewise utilize in conjunction therewith a fly wheel or other momentum device whose inertia is caused automatically to rewind or backwardly wind the record wire when its forward feed has closed. The inertia of the fly-wheel causes a gradual stopping and starting of the wire and prevents its sudden subjection to undue tension, and at the same time insuring against an undesired slackening and loosening of the coils of the wire.

As a convenient means of controlling the operation of the reel shafts by the motor and the momentum wheel, I provide clutches which are so operated as to automatically connect the reverse reel shaft with the momentum wheel when the positive rotation of the forward reel shaft ceases or the motor ceases to function.

On the accompanying drawings,—Figure 1 represents in plan view a machine containing one embodiment of the invention. Fig. 2 represents a front elevation of the same. Fig. 3 represents a section on the line 3—3 of Fig. 1. Fig. 4 represents a section on the line 4—4 of Fig. 1. Fig. 5 illustrates diagrammatically the electric circuit and a simple remote controlling switch mechanism which may be utilized in connection with the machine. Fig. 6 illustrates a device for breaking the motor circuit when the record wire is nearly unwound from one of the reels.

On the accompanying drawings, I have not endeavored to illustrate the machine as equipped with a telephone or talking circuit, but have shown merely the reels and the mechanism for driving and controlling them, and the electric circuit which includes the motor and the clutch-operating electromagnet.

10 indicates a suitable base upon which are mounted two plates 11 and 12 having standards which serve as bearings for the forward and reverse reel shafts 13 and 14. The plates 11 and 12 are provided with standards 15 and 16, said standards 15 having pivoted therein by screws 17 bearing sleeves 18 in which the shafts 13 and 14 are journaled. Said shafts 13 and 14 pass through enlarged apertures 19 in the standards 16, and their forward ends are journaled in bearing sleeves 20 20 pivoted by screws 21 in pivoted standards 22. The forward and reverse reels, which are indicated at 23 and 24, may be placed on and removed from the shafts 13 and 14. By swinging the pivoted standards forward, they may be disengaged from the ends of the shafts so as to permit the removal or attachment of the reels. The standards 22 are mounted upon pivots 25 with which they have a frictional engagement so that they will remain in any position to which they may be moved.

The reels may be formed in any convenient way. As illustrated, they consist of metallic shell-like winding drums or bobbins having circumferential flanges 26, and are removably keyed on hubs 261 attached to the ends of the shafts. The record wire is indicated at $a$ and it is fed by said reels in proximity to an electromagnetic mechanism which is indicated as a whole at $b$, and whose cores impress upon the wire magnetically a record of the electrical pulsations or waves of an electric telephone circuit connected to the electromagnets.

As the telephone circuit forms no part of the invention, I have not illustrated it, nor have I illustrated in detail the construction of the electromagnets and cores included in the mechanism $b$.

The shafts 13 14 are driven positively in opposite directions respectively and, in the particular construction illustrated on the drawings, are started and stopped at will, as I will now explain.

27 indicates an electric motor having an armature or primary driving shaft 28. The base of this motor is secured upon the base 10 between the base-plates 11 and 12.

While I have illustrated an electric motor, I desire to have it understood that I may utilize any other form of motor which may be convenient or suited for the purpose. On its front end, the armature or primary driving shaft 28 is provided with a momentum wheel 29 and with a driving pulley 30. From said pulley 30, power is imparted to the intermediate driving shaft 31, which is journaled in cross-bars 32 33 attached at their ends to upright extensions of the standards 15 and 16. The intermediate driving shaft is formed with a large weighted pulley 34 which is connected by a belt 35 with the pulley 30. The large wheel or pulley 34 performs two functions; first, it serves as an element in the mechanism for transmitting power from the motor to the intermediate shaft 31, and, second, it serves as a momentum or fly-wheel for a purpose which will be subsequently explained. Upon the two shafts 13 and 14 are secured pulleys 36 and 37 which are connected by belts 38 39 with pulleys 40 41 mounted loosely on the intermediate shaft 31. The belt 39, as shown in Fig. 2, is crossed so that although the intermediate shaft 31 may be driven unidirectionally by the motor, yet the pulleys 36 and 37 will be driven in opposite directions by their respective pulleys 40 and 41. I have stated that the pulleys 40 and 41 are mounted loosely upon the intermediate shaft 31. In order, therefore, to transmit power thereto from the said pulleys, I employ any suitable form of clutch mechanism which will accomplish the purpose to be stated. A convenient form consists of a radial clutch member 42 arranged in a slot in the shaft 31 and secured to the end of a rod 43 which is inserted in a socket in the end of said shaft. The two pulleys 40 and 41 are provided with studs or projections 44 44, 45 45, respectively, with which the radial clutch member 42 may be brought into engagement by shifting the rod 43 in one direction or the other. As illustrated in Fig. 3, the pulley 40 is clutched to the shaft 31 so that the reverse shaft 13 will be driven positively, the other clutch at the same time running loose as the wire is drawn from the reel 24 by the reel 23. This causes what I may term a "reverse" or backward movement of the wire. Thus, either of the reels may be rotated when the other is running free, and hence the wire will be wound upon the power-driven reel and unwound from the loosely-running reel. It will be appreciated that, in lieu of this particular construction of power - transmitting elements which I have illustrated and described, any other suitable power-transmitting mechanism may be substituted which will accomplish this result.

For the purpose of operating the rod 43, any suitable mechanism may be utilized. I have shown a convenient mechanism for this purpose comprising a solenoid magnet 46 whose plunger 47 is normally held raised by a spring 48. The plunger is provided with a rod 49 having on its threaded end two nuts 50 51 between which is located the end of an arm 52 apertured to receive the threaded end of the rod 49. The arm 52 is secured upon a rock-shaft 53 journaled in bearings on the bar 32. Secured to the rock-shaft 53 is another arm 54 arranged at substantially right angles to the arm 52 and having its end located in a peripheral groove in a collar 55 attached to the rod 43, as shown in Fig. 3. When no current is passing through the solenoid 46, the plunger 48 is raised and the radial clutch member 42 is held by the spring 48, through the medium of the rock-shaft 53, the arms 52 and 54, and the rod 43, in clutched engagement with what I may term the "reverse" pulley 40. When the solenoid 46 is energized, the plunger 47 is drawn downwardly and the clutch member 42 is moved into clutched engagement with the forward pulley 41, so that the forward shaft 14 may be driven to effect the winding of the wire upon the reel 24. For the purpose of distinguishing the reels and their driving mechanism, I have termed the reel 24 the "forward" reel, and the reel 23 the "reverse" reel, and I have applied the same terminology to their respective driving shafts and pulleys.

In Fig. 5 I have illustrated diagrammatically an electric circuit which includes the motor and the solenoid, and I have illustrated a simple, remote contact, switch mechanism which may be utilized for stopping and starting the motor, and for energizing or deënergizing the solenoid as the case may be.

I desire to have it understood at the outset, that any other form of mechanism, whether at or remote from the machine, may be utilized in lieu of that shown and described.

On the said drawings, $c$ $c'$ indicate conductors of the main circuit. The conductor $c'$ is connected to the motor. The conductor $c$ has two branches $c^2$ $c^3$ which are connected with contacts $c^4$ $c^5$ of the switch mechanism. A conductor $c^6$, which forms a part of the main circuit, divides as at $c^7$ $c^8$, the branches being connected with the standards $c^9$ $c^{10}$ of the switch mechanism. In the standards $c^9$ $c^{10}$ are pivoted movable contacts or switches $d$ $d'$ which may be moved by keys $e$ $e'$ into engagement with the contacts $c^4$ $c^5$ so as to close the circuit through the motor. The keys $e$ $e'$ are arranged over the movable switch contacts $d$ $d'$ and are held yieldingly upward by springs $f$ $f'$. The key spindles are mounted in an inclosing casing $g$ which has an internal cross-bar or guide $g'$. The solenoid 46 is connected by a conductor $h$ with the conductor $c'$ of the main circuit, and by a conductor $h'$ with a contact $h^2$ in proximity to the contact $c^4$, when the switch $d$ is closed, part of the current from the main circuit will pass through the motor and a part through the solenoid. Thus the solenoid is energized only when the switch or movable contact $d$ is closed by the key $e$. Hence, when it is desired to drive the forward reel shaft, the key $f$ is depressed to close the switch $d$, and, when it is desired to drive the reverse reel shaft, the key $e'$ is depressed to close the switch $d'$. For the purpose of breaking the circuit through the motor (and through the solenoid if it be in circuit), I provide a third key indicated at $i$, which is normally held upward by a spring $i'$. The lower end of said key is adapted to engage the ends of the switches $d$ $d'$ which project toward each other and raise either switch which may be closed.

In addition to the make and break switches which I have described, I also provide circuit-breakers which are operated to cut out the current from the motor before the wire is entirely unwound from either of the reels. The circuit-breakers comprise switches 56 which are placed in the main circuit, as shown in Fig. 5, and which are adapted to engage stationary contacts 57. Said switches, as illustrated in Figs. 2 and 4, are pivoted midway between their ends upon studs 58, and they are located in front of the standards 16 and immediately in the rear of the reels 23 and 24. The reels are provided with wire-controlled devices which may engage the switches when the wire is nearly exhausted from one or the other of the reels so as to break the main circuit. Any suitable device for this purpose may be utilized, although I have shown a convenient construction in Fig. 6. From this figure, it will be seen that a finger 59 projects through a slot in the flange 26 so as to lie in the groove in the reel. The finger is mounted upon the end of the plunger 60 which is forced radially outward of the reel by a spring 61, the plunger and the spring being mounted in a socket member 62 attached to the hub 261. When the wire is wound upon the reel, it moves the finger 59 and the plunger radially inward and holds them there; but, when the wire is nearly exhausted, it releases the finger and permits the plunger to move radially outward. The circuit breakers 56 (as shown in Fig. 3) are mounted as previously stated in the rear of the reels. When the fingers and plungers are in their normal positions, as when the reels are more or less filled with wire, then the reels may freely rotate without the plungers engaging the switches, but as soon as one of the fingers is released, the plunger moves radially outward where it may engage the adjacent switch 56 and throw said switch about its pivot 58 so as to break the main circuit.

To re-set the switches 56, I employ a slide 64 whose ends rest upon the bases 11 and 12, as shown in Figs. 2 and 3. The ends of the slide are up-turned as at 65, so that when moving the slide in one direction or the other, the switches may be moved about their pivots so as to engage them with their contacts 57. The slide 64 is reciprocated by means of a lever 66 which is pivoted at its rear end as at 67 to the base plate of the motor. The lever is normally centered by two springs 68 68.

In order that the operator may ascertain the amount of wire upon the reels, the outer flanges of the reels are provided with radial slots 70 70, as shown in Fig. 2, through which the wire may be seen. If desired, a small scale may be formed on the reel at the side of each aperture, as indicated at 71.

The operation of the device is as follows: Assuming that the motor is in a state of rest and that the operator desires the record wire to be fed forward either for the purpose of forming a record thereon or listening to a previously formed record, he depresses the key $e$ of the switch mechanism. This closes the switch $d$ and consequently closes the circuit through the motor and the solenoid. As the plunger 47 is drawn by the solenoid, the clutch member 42 is moved into engagement with the complemental clutch members 44 on the pulley 41, so that the forward shaft 14 will be clutched to the driver through the power-transmitting connections. The motor shaft, as soon as the circuit is closed through the motor, instantly begins to rotate, and soon overcomes the inertia of the momentum wheels until they are rotating at a practically constant and unvarying speed. If the operator be listening to the record for the purpose of transcribing the same, it will be necessary to stop the forward feed of the wire, as few operators are capable of operating upon a typewriter as rapidly as a person dictates. Consequently the operator depresses the key $i$ so as to open the switch $d$. The circuit through the motor and through the solenoid is instantly opened and the spring 48 forces upward the rod 49 so as to shift the clutch 42 into engagement with the pulley 40. The momentum driver, by reason of its inertia, continues to rotate, and the clutching of the shaft 13 thereto causes the forward feeding of the wire to be arrested and the wire to be fed backward or wound upon the reverse reel 23. The momentum driver comes gradually to a state of rest after having reversely wound a portion of the wire. Then the operator may again close the switch $d$ and start the motor, at the same time shifting the clutch into engagement with the pulley 41 so as to drive the forward reel shaft. By the time the reel shaft 14 comes to its proper speed, not all of the wire which has been re-wound will be fed forward so that the operator is able to hear repeated a portion of the record.

From the description of the operation of the machine, it will be noted that the reels 23 and 24 are separately driven to cause the reverse or forward feed of the wire, the other running free at the time, the reels being driven by the oppositely rotatable shafts 13 and 14 respectively. To cause a cessation of movement of the wire, two opposite or opposed rotative forces generated by the motor are simultaneously applied to it; as for instance, the forward feed of the wire is stopped, when the clutch is shifted, because the rotary force or inertia of the forward reel 24, shaft 14 and pulley 37, is opposed by the rotary force or inertia of the momentum device which is clutched to the reverse reel 23. In addition, the force or inertia of the momentum device overcomes that of the forward reel and the adjacent moving parts, and causes a short backward feed of the wire after the forward feed has stopped.

I have herein referred to the shaft 31 having a momentum wheel as a "momentum driver," since in this particular form of invention the weight is located in the pulley 34. It should be understood, however, that the storage of the energy could be caused to occur in some other part of the apparatus, as for instance in the momentum wheel on the motor or armature shaft, as shown at 29, or could be effected by adding weight to the armature itself. In any event, the inertia of the momentum device or momentum driver should be greater than that of the wire, the wheels and the power-transmitting connections between the wheels and the driver. To this end, in addition to weighting the pulley 34 or some other part of the driving member, I preferably form the reels and such parts of the power-transmitting connections as may be of aluminum or other relatively light material.

From the foregoing description it will be seen that by a very simple mechanism, I have achieved the objects stated in the preamble of this specification. The momentum device insures the feeding of the wire at practically a constant or unvarying rate of speed, it provides for the automatic partial rewinding of the wire upon its stoppage of the forward feed thereof, and it causes the parts to be brought to a state of rest without danger of the wire slackening or becoming dislocated from the reel. This is all accomplished without the aid of braking devices or complicated driving mechanisms.

By reason of the construction and arrangement of the parts as described, the reel, which is receiving the wire, comes gradually to a state of rest, as stated, without an increased tension upon the wire, as will be caused by applying the brake to the delivery reel, and, since the momentum or inertia of the parts connected with the receiving reel is greater than that of the delivery reel and the parts connected therewith, the delivery reel tends to stop rotating much sooner than the receiving reel, and consequently there is a gradually decreasing pull upon the wire until the receiving reel comes to a state of rest. Thus a gradually decreasing rotary force is applied to the receiving reel for a period of time greater than the time required for the delivery reel to come to a state of rest. To state this in another way, it may be said that the period of time required for the normal decadence of the inertia of the delivery reel is less than the time required for the decadence of the inertia of the receiving reel reinforced by the inertia momentum device herein described. The inertia of the parts connected with the receiving reel effects the rotation of the said reel so as to carry the wire beyond the point of natural rest when the machine is stopped. The purpose of this will be understood when it is realized that, by the continued rotation of the receiving reel, as explained, the delivering reel will not rotate faster or farther than the receiving reel so as to release or permit the slackening of the wire.

Having thus explained the nature of my said invention and described a way of constructing and using the same, although without attempting to set forth all of the forms in which it may be made or all of the modes of its use, what I claim is:

1. In a machine such as described, a record wire, reels therefor, and mechanism for driving said reels, said mechanism comprising a power-transmitting means and a momentum driver whose inertia is greater than that of the reels, the wire and the power-transmitting means.

2. In a machine such as described, a record wire, reels therefor, and mechanism for driving said reels in opposite directions respectively, comprising a momentum driver, a power-transmitting connection between said driver and each of said reels, and clutching means for clutching said connections to said driver, the inertia of said driver being greater than that of the wire, the reels and the power-transmitting connections combined.

3. In a magnetic talking machine, a record wire, reels for said wire, a forward reel shaft, a reverse reel shaft, and mechanism for driving said shafts in opposite directions respectively, said driving mechanism comprising a motor, a momentum device, and means in consequence of which the reverse shaft is rotated by the inertia of said device to wind reversely the record wire automatically when the forward winding of the wire by the forward reel shaft is stopped.

4. In a magnetic talking machine, a record wire, reels therefor, a forward reel shaft, a reverse reel shaft, and mechanism for driving said shafts in opposite directions respectively, said mechanism comprising a momentum device and clutching means by which the reverse shaft is rotated automatically by the inertia of the momentum device when the forward reel shaft is unclutched.

5. In a magnetic talking machine, a record wire, reels therefor, a forward reel shaft, a reverse reel shaft, and mechanism for driving said shafts in opposite directions respectively, said mechanism comprising a momentum driver, a motor for actuating said driver, and means for clutching said shafts alternately to said driver, said clutching means being so constructed and arranged that said clutching means connects the reverse shaft to the momentum driver when the forward shaft is disconnected therefrom.

6. In a magnetic talking machine, reels for the record wire, a forward reel shaft, a reverse reel shaft, and driving mechanism for rotating said shafts in opposite directions respectively, said mechanism comprising a motor, means for connecting said shafts alternately to the motor, and a motor-driven momentum wheel, said means being so constructed, arranged and operated that said momentum wheel drives the reverse shaft by its inertia when the forward shaft is disconnected from the motor.

7. In a magnetic talking machine, a record wire, reels therefor, forward and reverse reel shafts, and mechanism for driving said shafts respectively in opposite directions, said means comprising a motor, a motor-driven momentum wheel, clutch connections between the motor and said shafts, and means for operating said clutch connection, in consequence of which said momentum wheel automatically drives the reverse reel shaft by its inertia when the motor is rendered ineffective.

8. In a magnetic talking machine, a record wire, reels therefor, forward and reverse reel shafts, an electric motor, connections between said motor and said shaft, including clutching means, and a momentum device driven by said motor, and means by which said momentum device is clutched to the reverse shaft automatically when the motor is deënergized.

9. In a magnetic talking machine, a record wire; reels therefor; forward and reverse reel-shafts; an electric motor; a momentum device driven thereby; connections between said motor and momentum device and said shafts for driving said shafts in opposite directions respectively, said connections including alternately operable clutches; an electromagnetic clutch-operating device; and an electric circuit including said motor, said electromagnetic clutch-operating device, and switches for controlling the motor and the said electromagnetic clutch-operating device, in consequence of which the momentum device is clutched to the reverse reel-shaft to cause its actuation after current is cut out of said motor.

10. In a magnetic talking machine, a record wire, reels therefor, forward and reverse reel shafts, a driving shaft, a motor therefor, a momentum wheel on said driving shaft, connections between said driving shaft and said reel shafts for driving the latter in opposite directions respectively, clutches for rendering said connections alternately active, and clutch-operating mechanism, substantially as set forth.

11. In a magnetic talking machine, a record wire, reels therefor, forward and reverse reel shafts, a motor, an intermediate driving shaft driven by the motor, driving wheels mounted loosely on the intermediate shaft, driven means on the reel shafts actuated by the wheels on the intermediate shaft, and means for alternately clutching the driving wheels on the intermediate shaft to said intermediate shaft.

12. In a talking machine such as described, a record wire, reels therefor, a motor for actuating said reels, and means controlled by the record wire on the reels for stopping the motor when the wire is nearly exhausted from one or the other of said reels.

13. In a talking machine of the character described, a record wire, a receiving reel, a delivery reel, and rotary means for imparting a gradually decreasing force to the receiving reel for a period of time greater than the normal decadence of the inertia of the delivery reel when the machine is coming to a state of rest.

14. In a talking machine of the character described, a record wire, a receiving reel, a delivery reel, and means for promoting the rotation of the receiving reel beyond the point of natural rest of the delivery reel, to prolong the movement of the wire when the machine is brought to a state of rest, substantially as set forth.

15. In a talking machine of the character described, a record wire, a freely rotatable delivery reel, and mechanism for rotating said receiving reel, said mechanism comprising means for exerting a gradually diminishing force to the receiving reel in excess of the inertia of the receiving reel when the machine is coming to a state of rest.

16. In a talking machine of the character described, a record wire, and power mechanism for feeding said wire, said power mechanism including means to stop the feeding of the wire by gradually decreasing the pull upon said wire in the direction of its movement.

17. In a talking machine of the character described, a record wire, a receiving reel, a delivery reel, a motor, power-transmitting mechanism, clutch mechanism for alternately connecting said reels to said power-transmitting mechanism whereby said reels are driven by power alternately in opposite directions, and means for applying to the delivery reel a gradually diminishing rotary force opposite to the delivering rotation of the delivery reel to bring it to a state of rest.

18. In a talking machine of the character described, a record wire and power mechanism for feeding said wire comprising a motor, receiving and delivery reels, and mechanism for connecting said motor to said reels, said mechanism including means for applying a diminishing rotary force in the opposite direction to said delivery reel to oppose the forward rotation of the receiving reel, and stop the forward feed of the wire.

19. In a talking machine of the character described, a motor having a unidirectionally moving driving member, a record wire, receiving and delivering reels, power-transmitting mechanism including clutching means for connecting said reels to said motor-driving member to cause their rotation in opposite directions, a motor controller, and means whereby, when the motor controller is operated to stop the motor, the motor-driving member is clutched to said delivery reel to stop its forward rotation.

20. In a talking machine, a record wire, receiving and delivering reels therefor, a motor, power-transmitting mechanism operated by the motor for rotating said reels respectively in opposite directions to feed the wire forward or backward, and means by which the rotary force generated by said motor and transmitted to said power-transmitting mechanism is applied to said reels at the same time to stop the feed of the wire.

21. In a talking machine, a record wire, receiving and delivery reels for feeding the wire, a motor having a unidirectionally rotatable driving member, power-transmitting mechanism operated by the motor for transmitting a rotary force to said reels, comprising oppositely rotatable shafts, and means by which said shafts are caused to transmit opposite or opposing rotary forces to said reels to stop the forward feed of the wire.

In testimony whereof I have affixed my signature, in presence of two witnesses.

RALPH C. BROWNE.

Witnesses:
WILLIAM QUINBY,
P. W. PEZZETTI.